(12) United States Patent
Ishioka et al.

(10) Patent No.: US 11,230,290 B2
(45) Date of Patent: Jan. 25, 2022

(54) VEHICLE CONTROL DEVICE, VEHICLE CONTROL METHOD, AND PROGRAM

(71) Applicant: HONDA MOTOR CO., LTD., Tokyo (JP)

(72) Inventors: Atsushi Ishioka, Wako (JP); Akira Mizutani, Wako (JP); Toru Kokaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 213 days.

(21) Appl. No.: 16/471,612

(22) PCT Filed: Nov. 20, 2017

(86) PCT No.: PCT/JP2017/041663
§ 371 (c)(1),
(2) Date: Jun. 20, 2019

(87) PCT Pub. No.: WO2018/123346
PCT Pub. Date: Jul. 5, 2018

(65) Prior Publication Data
US 2019/0382024 A1 Dec. 19, 2019

(30) Foreign Application Priority Data
Dec. 27, 2016 (JP) .............................. JP2016-253952

(51) Int. Cl.
*G01C 22/00* (2006.01)
*G05D 1/00* (2006.01)
*B60W 30/18* (2012.01)

(52) U.S. Cl.
CPC ..... *B60W 30/18163* (2013.01); *G05D 1/0061* (2013.01); *G05D 1/0088* (2013.01);
(Continued)

(58) Field of Classification Search
CPC ...... B60W 30/18163; B60W 2520/105; G05D 1/0061; G05D 1/0088; G05D 2201/0213
(Continued)

(56) References Cited

U.S. PATENT DOCUMENTS

| 5,535,830 A | 7/1996 | Matsushita et al. |
| 2016/0187879 A1* | 6/2016 | Mere ..................... B60W 40/09 701/23 |

(Continued)

FOREIGN PATENT DOCUMENTS

| CN | 105807764 | 7/2016 |
| CN | 106062853 | 10/2016 |

(Continued)

OTHER PUBLICATIONS

International Search Report and Written Opinion for International Application No. PCT/JP2017/041663 dated Feb. 13, 2018, 8 pgs.

(Continued)

*Primary Examiner* — Mahmoud S Ismail
(74) *Attorney, Agent, or Firm* — Amin, Turocy & Watson, LLP

(57) ABSTRACT

A vehicle control device (1) includes an automated driving control unit (100) configured to execute automated driving of a vehicle and an acquisition unit (124) configured to acquire movement states in a running direction and a lateral direction of the vehicle. The automated driving control unit is configured to execute the automated driving such that the movement states which have been acquired by the acquisition unit before the automated driving has been started are maintained in a predetermined time or a predetermined distance when automated driving has been started by switching from manual driving.

6 Claims, 6 Drawing Sheets

(52) U.S. Cl.
CPC ............... *B60W 2520/105* (2013.01); *G05D 2201/0213* (2013.01)

(58) Field of Classification Search
USPC .......................................... 701/23
See application file for complete search history.

(56) References Cited

U.S. PATENT DOCUMENTS

| | | | |
|---|---|---|---|
| 2016/0209841 A1 | 7/2016 | Yamaoka et al. | |
| 2017/0313311 A1* | 11/2017 | Niino ................... | B60W 30/146 |
| 2019/0308631 A1* | 10/2019 | Sato ...................... | B60W 40/10 |
| 2019/0359215 A1* | 11/2019 | Shimakage ........... | B60W 30/16 |

FOREIGN PATENT DOCUMENTS

| | | |
|---|---|---|
| JP | 3094100 | 10/2000 |
| JP | 2015-089801 | 5/2015 |
| JP | 2015-182525 | 10/2015 |
| JP | 2016-088334 | 5/2016 |
| JP | 2016-124542 | 7/2016 |
| JP | 2016-133985 | 7/2016 |
| JP | 2016-137819 | 8/2016 |
| WO | 2015/186648 | 12/2015 |
| WO | 2016/035486 | 3/2016 |

OTHER PUBLICATIONS

Chinese Office Action for Chinese Patent Application No. 201780080228.8 dated Oct. 29, 2021.

\* cited by examiner

VEHICLE CONTROL DEVICE, VEHICLE CONTROL METHOD, AND PROGRAM

TECHNICAL FIELD

The present invention relates to a vehicle control device, a vehicle control method, and a program.

Priority is claimed on Japanese Patent Application No. 2016-253952, filed Dec. 27, 2016, the content of which is incorporated herein by reference.

BACKGROUND ART

Recently, automated driving of a vehicle has been studied. Among techniques associated with automated driving, there are techniques for performing automated driving for driving support in some road sections. In this regard, a technique associated with automated driving in which a driving mode is switched between a manual driving mode in which a driver's driving operation is necessary and an automated driving mode is known (see Patent Literature 1).

CITATION LIST

Patent Literature

[Patent Literature 1]
Japanese Unexamined Patent Application, First Publication No. 2016-137819

SUMMARY OF INVENTION

Technical Problem

In the related art, there is a likelihood that abrupt steering or sudden acceleration or deceleration will occur after manual driving has been switched to automated driving.

The invention is made in consideration of the abovementioned circumstances and an objective thereof is to provide a vehicle control device, a vehicle control method, and a program that can realize smooth switching to automated driving.

Solution to Problem (1) A vehicle control device includes an automated driving control unit configured to execute automated driving of a vehicle and an acquisition unit configured to acquire movement states in a running direction and a lateral direction of the vehicle, wherein, when automated driving has been started by switching from manual driving, the automated driving control unit is configured to execute automated driving such that the movement states which have been acquired by the acquisition unit before the automated driving has been started are maintained for a predetermined time or a predetermined distance.

(2) In the vehicle control device according to (1), the automated driving control unit may start lane change after the vehicle has run a predetermined distance or a predetermined time in a case in which there is necessity for lane change due to branching when automated driving has been started by switching from manual driving.

(3) The vehicle control device according to (2) may further include an output unit configured to output information and an output control unit configured to cause the output unit to output information indicating that a lane on which the vehicle is running is different from a preset lane when the lane on which the vehicle is running is different from the preset lane after the automated driving control unit has started automated driving by switching from manual driving.

(4) In the vehicle control device according to any one of (1) to (3), the automated driving control unit may smoothly change a speed of the vehicle until the speed reaches a target speed when the vehicle is accelerating or decelerating after automated driving has been started.

(5) A vehicle control method causes a computer to perform: executing automated driving of a vehicle; acquiring movement states in a running direction and a lateral direction of the vehicle; and executing automated driving such that, when automated driving has been started by switching from manual driving, the movement states which have been acquired before automated driving has been started are maintained for a predetermined time or a predetermined distance.

(6) A program causes a computer to perform: executing automated driving of a vehicle; acquiring movement states in a running direction and a lateral direction of the vehicle; and executing automated driving such that, when automated driving has been started by switching from manual driving, the movement states which have been acquired before automated driving has been started are maintained for a predetermined time or a predetermined distance.

Advantageous Effects of Invention

According to (1), (5), and (6), it is possible to realize smooth switching to automated driving when manual driving is switched to automated driving and to prevent a driver from feeling a sense of incompatibility.

According to (2), by setting a corrected target path in an automated driving transition section, it is possible to inhibit behavior such as abrupt lane change or acceleration or deceleration of a host vehicle.

According to (3), when a host vehicle is running on an alternative lane in an automated driving transition section, information indicating that a lane on which the host vehicle is running is different from a preset lane is displayed for a driver and thus the driver can cope with behavior of the host vehicle after automated driving has been started.

According to (4), when the host vehicle is accelerating or decelerating after automated driving has been started, a speed of the host vehicle is smoothly changed until the speed reaches a target speed and thus it is possible to prevent abrupt acceleration or deceleration of the host vehicle.

DESCRIPTION OF EMBODIMENTS

Figure 1:
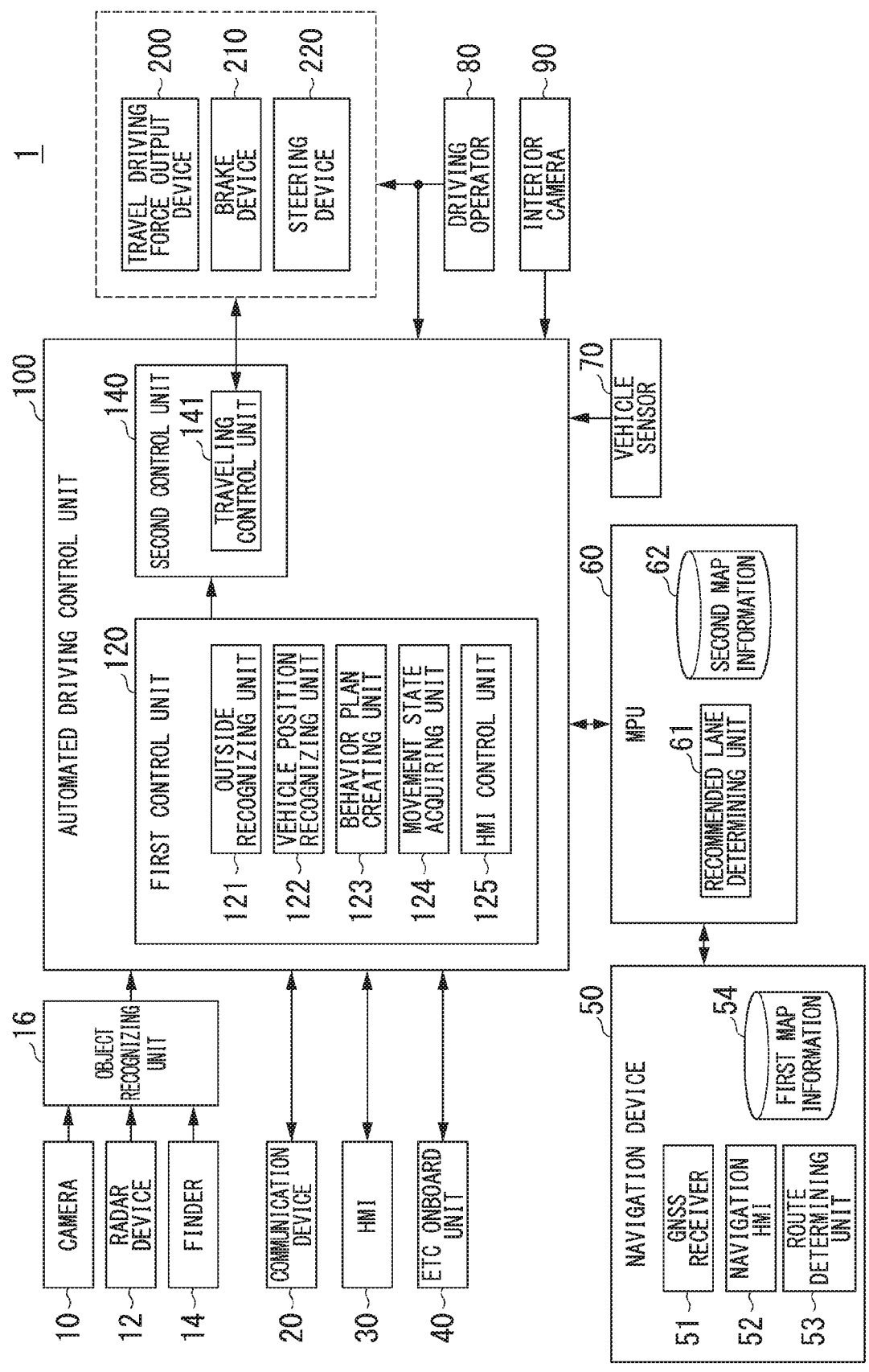
FIG. 1 is a diagram illustrating a configuration of a vehicle control device including an automated driving control unit according to an embodiment.

Hereinafter, embodiments of a vehicle control device, a vehicle control method, and a program according to the present invention will be described with reference to the accompanying drawings. In the following description, it is assumed that keep-left regulations are applied. In a road to which keep-right regulations are applied, right and left are reversed in the following description and drawings unless particularly mentioned. FIG. 1 is a diagram illustrating a configuration of a vehicle system 1 including an automated driving control unit 100. A vehicle in which the vehicle system 1 is mounted is, for example, a vehicle with two wheels, three wheels, or four wheels and a drive source thereof is an internal combustion engine such as a diesel engine or a gasoline engine, an electric motor, or a combination thereof. An electric motor operates using electric power which is generated by a power generator connected to the internal combustion engine or electric power which is discharged from a secondary battery or a fuel cell.

The vehicle control device 1 includes, for example, a camera 10, a radar device 12, a finder 14, an object recognizing device 16, a communication device 20, a human-machine interface (HMI) 30, an electronic toll collection system (ETC) onboard unit 40, a navigation device 50, a micro-processing unit (MPU) 60, a vehicle sensor 70, a driving operator 80, an interior camera 90, an automated driving control unit 100, a running driving force output device 200, a brake device 210, and a steering device 220. These devices or units are connected to each other via a multiplex communication line such as a controller area network (CAN) communication line, a serial communication line, or a radio communication network. The configuration illustrated in FIG. 1 is only an example and a part of the configuration may be omitted or another configuration may be added thereto.

The camera 10 is, for example, a digital camera using a solid-state imaging device such as a charge coupled device (CCD) or a complementary metal oxide semiconductor (CMOS) device. One or more cameras 10 are attached at arbitrary positions in a vehicle in which the vehicle control device 1 is mounted (hereinafter referred to as a host vehicle M). When imaging to the front is performed, the camera 10 is attached to an upper part of a front windshield, a rear surface of a rearview mirror, or the like. The camera 10 images the surroundings of the vehicle M, for example, periodically and repeatedly. The camera 10 may be a stereoscopic camera.

The radar device 12 radiates radio waves such as millimeter radio waves to the surroundings of the host vehicle M, detects radio waves (reflected waves) reflected by an object, and detects at least a position (a distance to and a direction) of the object. One or more radar devices 12 are attached at arbitrary positions in the host vehicle M. The radar device 12 may detect a position and a speed of an object using a frequency modulated continuous wave (FM-CW) system.

The finder 14 is a light detection and ranging or laser imaging detection and ranging (LIDAR) device that measures scattered light in response to applied light and detects a distance to an object. One or more finders 14 are attached at arbitrary positions in the host vehicle M.

The object recognizing device 16 performs sensor fusion processing on detection results from some or all of the camera 10, the radar device 12, and the finder 14 and recognizes a position, a type, a speed, and the like of an object. The object recognizing device 16 outputs the results of recognition to the automated driving control unit 100. The object recognizing device 16 may output some of information which is input from the camera 10, the radar device 12, or the finder 14 to the automated driving control unit 100 without any change.

The communication device 20 communicates with other vehicles near the host vehicle M, for example, using a cellular network, a Wi-Fi (registered trademark) network, Bluetooth (registered trademark), dedicated short range communication (DSRC), or the like or communicates with various server devices via a radio base station.

The HMI (display unit) 30 presents a variety of information to an occupant of the host vehicle M and receives an input operation from an occupant. The HMI 30 includes, for example, various display devices, speakers, buzzers, touch panels, switches, and keys. The HMI 30 displays information which is to be notified to a driver when switching to automated driving has been executed as will be described later.

The ETC onboard unit 40 includes an attachment slit to which an ETC card is attached and a radio communication unit that communicates with an ETC road-side unit which is provided at a gate of a toll road. The radio communication unit may be shared by the communication device 20. The ETC onboard unit 40 exchanges information with an entrance tollgate, an exit tollgate, or the like by communicating with an ETC road-side unit. The ETC road-side unit determines a fee for an occupant of the host vehicle M on the basis of the information and performs a charging process.

The navigation device 50 includes, for example, a global navigation satellite system (GNSS) receiver 51, a navigation HMI 52, and a route determining unit 53, and stores first map information 54 in a storage device such as a hard disk drive (HDD) or a flash memory. The GNSS receiver identifies a position of the host vehicle M on the basis of signals received from GNSS satellites. The position of the host vehicle M may be identified or complemented by an inertial navigation system (INS) using outputs of the vehicle sensor 70. The navigation HMI 52 includes a display device, a speaker, a touch panel, and keys. All or a part of the navigation HMI 52 may be shared by the HMI 30. For example, the route determining unit 53 determines a route from the position of the host vehicle M (or an input arbitrary position) identified by the GNSS receiver 51 to a destination input using the navigation HMI 52 by an occupant with reference to the first map information 54. The first map information 54 is, for example, information in which road shapes are expressed by links indicating roads and nodes connected by the links. The first map information 54 may include curvatures of roads or point of interest (POI) information. The route determined by the route determining unit 53 is output to the MPU 60. The navigation device 50 may perform guidance for a route using the navigation HMI 52 on the basis of the route determined by the route determining unit 53. The navigation device 50 may be realized, for example, by a function of a terminal device such as a smartphone or a tablet terminal which is carried by a user. The navigation device 50 may transmit a current position and a destination to a navigation server via the communication device 20 and may acquire a route which is returned from the navigation server.

The MPU 60 serves as, for example, a recommended lane determining unit 61 and stores second map information 62 in a storage device such as an HDD or a flash memory. The recommended lane determining unit 61 divides a route supplied from the navigation device 50 into a plurality of blocks (for example, every 100 [m] in a vehicle running direction) and determines a recommended lane for each block with reference to the second map information 62. The recommended lane determining unit 61 determines in which lane from the leftmost the vehicle is to run. When there is a branching point or a merging point in the route, the recommended lane determining unit 61 determines a recommended lane such that the host vehicle M runs on a rational route for going to a branching destination. Details thereof will be described later.

The second map information 62 is map information with higher precision than the first map information 54. The second map information 62 includes, for example, information of the center of each lane or information of boundaries of each lane. The second map information 62 may include road information, traffic regulations information, address information (addresses and post numbers), facility information, and phone number information. The road information includes information indicating a type of each road such as an expressway, a toll road, a national road, and a prefectural road or information such as the number of lanes in each road, a width of each lane, a gradient of each road, a position of each road (three-dimensional coordinates including longitude, latitude, and height), curvatures of curves of each lane, positions of merging and branching points of lanes, and traffic signs marked on each road. The second map information 62 may be updated from time to time by accessing another device using the communication device 20.

The vehicle sensor 70 includes a vehicle speed sensor that detects a speed of the host vehicle M, an acceleration sensor that detects an acceleration, a yaw rate sensor that detects an angular velocity around a vertical axis, and a direction sensor that detects a direction of the host vehicle M.

The driving operator 80 includes, for example, an accelerator pedal, a brake pedal, a shift lever, a steering wheel, and other operators. Sensors that detect an amount of operation or performing of an operation are attached to the driving operator 80, and results of detection thereof are output to the automated driving control unit 100, the running driving force output device 200, or one or both of the brake device 210 and the steering device 220.

The interior camera 90 images an upper half of an occupant sitting on a driver's seat with a focus on a face of the occupant. Images captured by the interior camera 90 are output to the automated driving control unit 100.

The automated driving control unit 100 includes, for example, a first control unit 120 and a second control unit 140. Each of the first control unit 120 and the second control unit 140 is embodied by causing a processor such as a central processing unit (CPU) to execute a program (software). Some or all of functional units of the first control unit 120 and the second control unit 140 which will be described below may be embodied by hardware such as a large scale integration (LSI), an application specific integrated circuit (ASIC), or a field-programmable gate array (FPGA) or may be embodied in cooperation of software and hardware.

The first control unit 120 includes, for example, an outside recognizing unit 121, a vehicle position recognizing unit 122, a behavior plan creating unit 123, a movement state acquiring unit 124, and an HMI control unit (display control unit) 125. A combined configuration of the behavior plan creating unit 123 and the second control unit 140 corresponds to an example of an "automated driving control unit," and a configuration in which the movement state acquiring unit 124 is added thereto corresponds to an example of a "vehicle control device."

The outside recognizing unit 121 recognizes states such as positions, speeds, and accelerations of neighboring vehicles on the basis of information input from the camera 10, the radar device 12, and the finder 14 via the object recognizing device 16. A position of a neighboring vehicle may be expressed by a representative point such as the center of gravity or corners of the neighboring vehicle or may be expressed by an area which is represented by an outline of the neighboring vehicle. A "state" of a neighboring vehicle may include an acceleration, a jerk, or a "behavior condition" (for example, whether lane change is being performed or is intended) of the neighboring vehicle. The outside recognizing unit 121 may recognize positions of guard rails, utility poles, parked vehicles, pedestrians, and other objects in addition to neighboring vehicles.

The vehicle position recognizing unit 122 recognizes, for example, a lane (a running lane) in which the host vehicle M is running and a position and an orientation of the host vehicle M relative to the running lane. The vehicle position recognizing unit 122 recognizes the running lane, for example, by comparing a pattern of road defining lines near the host vehicle M which is recognized from images captured by the camera 10 with a pattern of road defining lines (for example, arrangements of solid lines and dotted lines) which is acquired from the second map information 62. In this recognition, the position of the host vehicle M acquired from the navigation device 50 or processing results from the INS may be considered.

Figure 2:
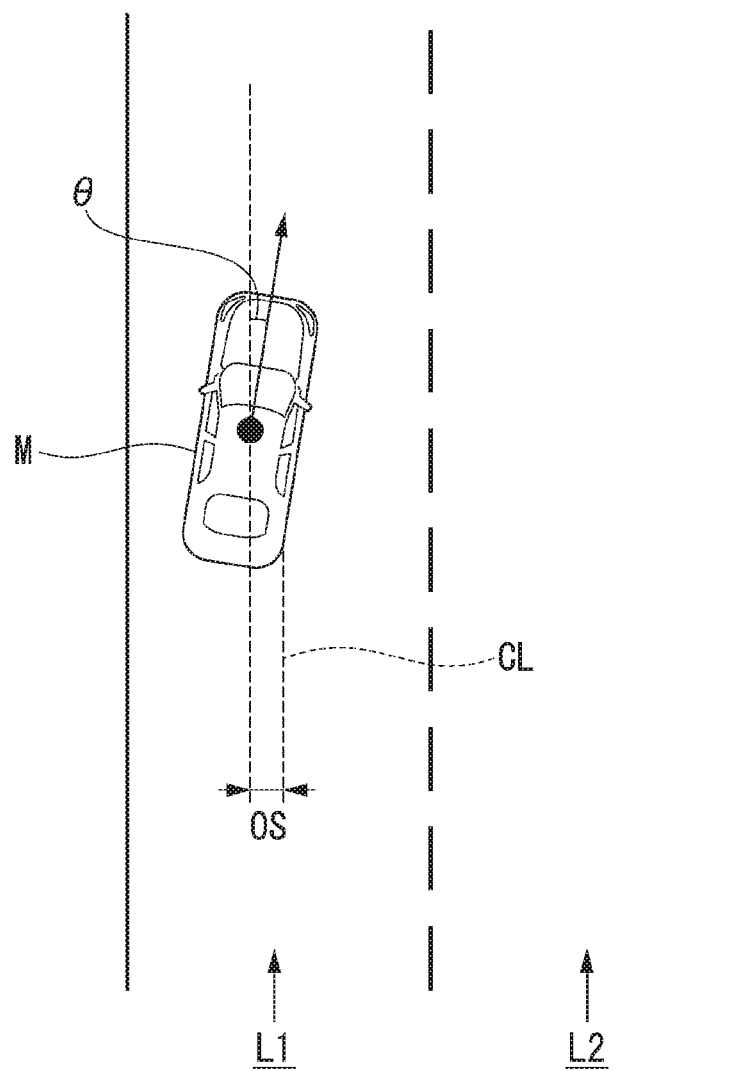
FIG. 2 is a diagram illustrating a state in which a position and an orientation of a host vehicle relative to a running lane are recognized by a vehicle position recognizing unit.

Then, the vehicle position recognizing unit 122 recognizes, for example, a position and an orientation of the host vehicle M relative to the running lane. FIG. 2 is a diagram illustrating a state in which a position and an orientation of the host vehicle M relative to a running lane L1 are recognized by the vehicle position recognizing unit 122. The vehicle position recognizing unit 122 recognizes, for example, a separation OS of a reference point (for example, the center of gravity) of the host vehicle M from a running lane center CL and an angle θ formed by a running direction of the host vehicle M and a line of the running lane centers CL as the position and the orientation of the host vehicle M relative to the running lane L1. Instead, the vehicle position recognizing unit 122 may recognize a position of the reference point of the host vehicle M relative to one edge of the running lane L1 or the like as the position of the host vehicle M relative to the running lane. The relative position of the host vehicle M recognized by the vehicle position recognizing unit 122 is supplied to the recommended lane determining unit 61 and the behavior plan creating unit 123.

The behavior plan creating unit 123 determines events which are sequentially executed in automated driving such that the host vehicle runs in a recommended lane determined by the recommended lane determining unit 61 and measures for surrounding conditions of the vehicle M can be taken. Examples of the events include a constant-speed running event in which the host vehicle runs in the same running lane at a constant speed, a following running event in which the host vehicle follows a preceding vehicle, a lane change event, a merging event, a branching event, an emergency stop event, and a handover event in which automated driving is ended and switched to manual driving. During execution of such events, behavior for avoidance may be planned on the basis of surrounding conditions of the host vehicle M (such as presence of a neighboring vehicle or a pedestrian and lane narrowing due to roadwork).

The behavior plan creating unit 123 generates a target path in which the host vehicle M will run in the future. A target path is expressed by sequentially arranging points (path points) at which the host vehicle M will arrive. A path point is a point at which the host vehicle M will arrive for each running distance. Separately therefrom, a target speed and target acceleration every predetermined sampling time (for example, about below the decimal point [sec]) are generated as a part of the target path. A path point may be a position at which the host vehicle M will arrive at a sampling time every predetermined sampling time. In this case, information of a target speed or target acceleration is expressed by intervals between the path points.

The behavior plan creating unit 123 creates a behavior plan for switching between automated driving and manual driving at a start point and an end point of a section in which a predetermined automated driving is executed on the basis of the behavior plan. The movement state acquiring unit 124 acquires a movement state of the host vehicle M on the basis of various types of data output from the vehicle sensor 70. For example, the movement state acquiring unit 124 acquires an acceleration or deceleration state in the running direction of the host vehicle M and an acceleration or deceleration state in the lateral direction perpendicular to the running direction. The HMI control unit 125 displays information requiring notification to a driver via the HMI 30 when manual driving is switched to automated driving. The behavior plan creating unit 123 changes the behavior plan according to the running state of the host vehicle M after manual driving has been switched to automated driving on the basis of data of the vehicle state acquired by the movement state acquiring unit 124.

Control for this change will be described later in detail.

Figure 3:
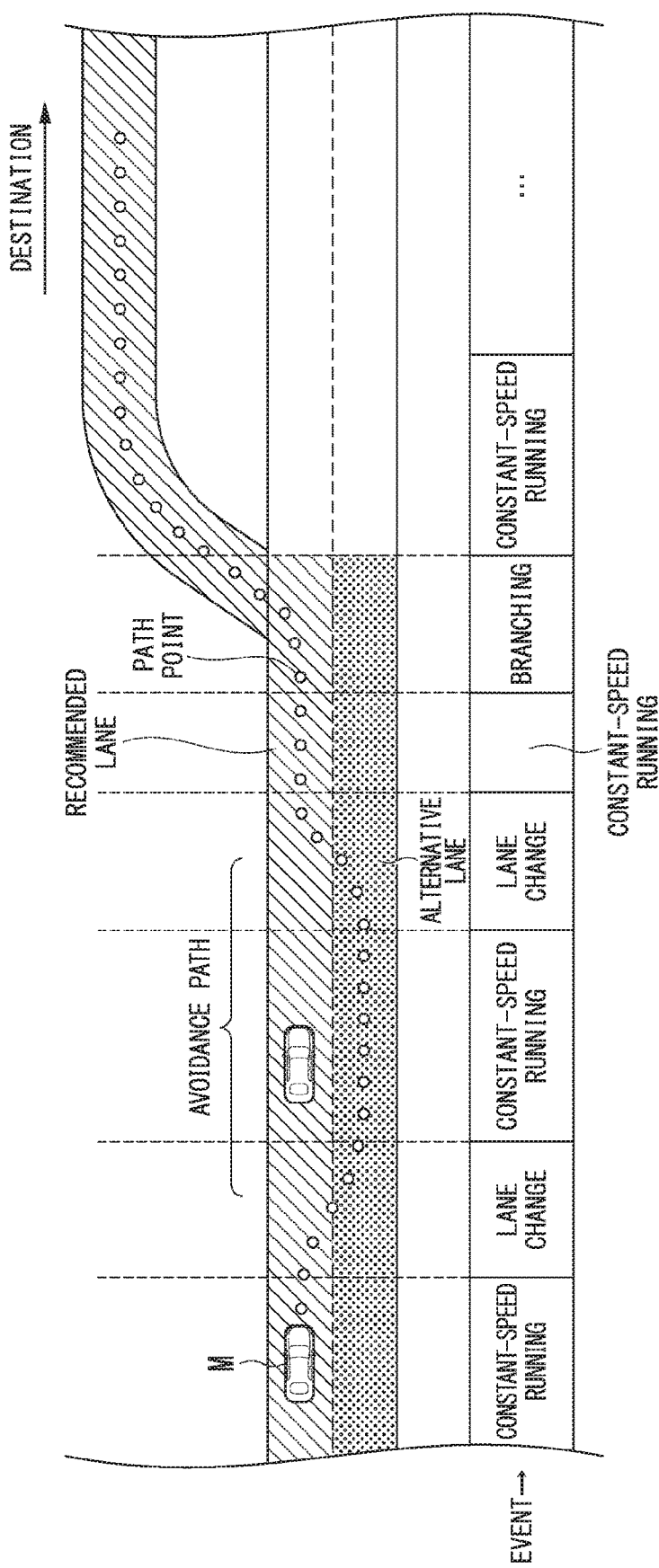
FIG. 3 is a diagram illustrating a state in which a target path is generated on the basis of a recommended lane.

FIG. 3 is a diagram illustrating a state in which a target path is generated on the basis of a recommended lane. As illustrated in the drawing, a recommended lane is set to be convenient for running along a route to a destination. When the host vehicle reaches a position which is a predetermined distance (which may be determined depending on a type of an event) before a switching point of the recommended lane, the behavior plan creating unit 123 starts a lane change event, a branching event, a merging event, or the like. When it is necessary to avoid an obstacle during execution of each event, an avoidance path is generated as illustrated in the drawing.

For example, the behavior plan creating unit 123 generates a plurality of candidates for a target path and selects an optimal target path which is suitable at that time in view of safety and efficiency.

The second control unit 140 includes, for example, a running control unit 141. The running control unit 141 controls the running driving force output device 200, the brake device 210, and the steering device 220 such that the host vehicle M passes along the target path generated by the behavior plan creating unit 123 as scheduled.

The running driving force output device 200 outputs a running driving force (a torque) for allowing a vehicle to run to driving wheels. The running driving force output device 200 includes, for example, a combination of an internal combustion engine, an electric motor, and a transmission and an ECU that controls them. The ECU controls the above-mentioned configuration on the basis of information input from the running control unit 141 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of information input from the running control unit 141 or information input from the driving operator 80 such that a brake torque based on a braking operation is output to vehicle wheels. The brake device 210 may include a mechanism for transmitting a hydraulic pressure generated by an operation of a brake pedal included in the driving operator 80 to the cylinder via a master cylinder as a backup. The brake device 210 is not limited to the above-mentioned configuration, and may be an electronically controlled hydraulic brake device that controls an actuator on the basis of information input from the running control unit 141 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of information input from the running control unit 141 or information input from the driving operator 80 to change the direction of the turning wheels.

A configuration in which a recommended lane or an alternative lane is selected to set a target path by the recommended lane determining unit 61 will be described below. An alternative lane is a lane which can be temporarily set by the recommended lane determining unit 61. The recommended lane determining unit 61 sets a target path on a recommended lane in principle such that the host vehicle runs along the target path (see FIG. 3). The recommended lane determining unit 61 sets a recommended lane and an alternative lane on the basis of following conditions. The following conditions are only an example and some conditions thereof may be omitted or other conditions may be added thereto.

(1) When there are a plurality of candidate lanes for setting a recommended lane, the recommended lane determining unit 61 sets the leftmost lane in the running direction of the host vehicle M (the rightmost lane in a case of keep-right) as a recommended lane. That is, the recommended lane determining unit 61 sets a recommended lane such that the host vehicle does not run in an alternative lane in principle.

(2) When a running lane disappears or branches within a predetermined distance (for example, 2 km) forward from the host vehicle M, the recommended lane determining unit 61 selects a recommended lane with a lane other than the running lane as a target path. That is, when there is necessity for lane change if the host vehicle M continues to run in the running lane, the recommended lane determining unit 61 sets a recommended lane such that lane change is performed in advance.

(3) When a direction of a destination is a lane of a branching destination at a branching point of a lane, the recommended lane determining unit 61 selects a recommended lane with a lane of a branching destination or a lane adjacent to the lane of a branching destination as a target path at a point which is prior a predetermined distance (for example, 1 km) to the branching point. That is, when there is necessity for lane change due to branching, the recommended lane determining unit 61 sets a recommended lane to a lane of a branching destination or a lane adjacent to the lane of a branching destination such that lane change can be easily performed.

(4) At a point at which a branch lane can merge to a main lane at a merging point of lanes, the main lane is set as a target path. That is, the recommended lane determining unit 61 sets a recommended lane such that the running lane merges to the main lane at the merging point.

When a target path is set on a recommended lane which is set by the recommended lane determining unit 61, the behavior plan creating unit 123 may set a new target path on an alternative lane which is a lane adjacent to the recommended lane. For example, the behavior plan creating unit 123 may temporarily set a target path on an alternative lane depending on surrounding conditions of the host vehicle M to perform lane change.

The behavior plan creating unit 123 dynamically changes a behavior plan depending on surrounding conditions on the basis of the results of recognition from the object recognizing device 16. For example, when a low-speed vehicle or an obstacle is discovered in front of the host vehicle during running on a recommended lane, the behavior plan creating unit 123 selects a lane change event and sets a target path on an adjacent alternative lane to perform lane change. The behavior plan creating unit 123 changes the behavior plane such that the host vehicle switches the target path from the recommended lane to the alternative lane to perform lane change and performs lane change to return to the recommended lane after the obstacle or the low-speed vehicle has been avoided or overtaken (see FIG. 3).

When manual driving has been switched to automated driving, the behavior plan creating unit 123 may create a behavior plan at that time. Control of the host vehicle M after manual driving has been switched to automated driving will be described below in detail.

Figure 4:
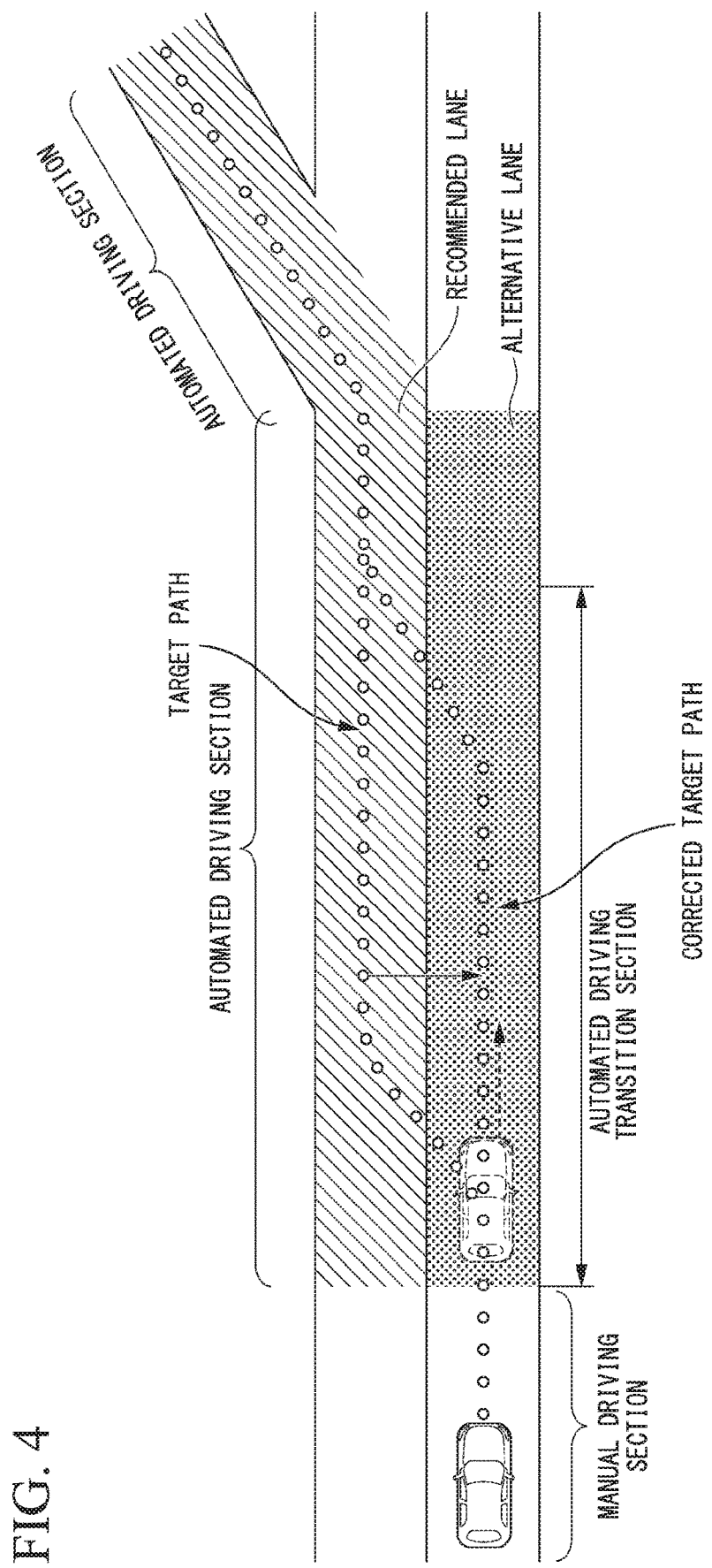
FIG. 4 is a diagram illustrating a path of a host vehicle after manual driving has been switched to automated driving.

FIG. 4 is a diagram illustrating a path of the host vehicle M after manual driving has been switched to automated driving. The behavior plan creating unit 123 sets an automated driving transition section after manual driving has been switched to automated driving. The automated driving transition section is a section which is set to realize smooth switching to automated driving. The automated driving transition section is set within a predetermined distance or a predetermined time from a point at which automated driving has been started. As illustrated in the drawing, when the host vehicle M runs along a target path based on a predetermined behavior plan, there is a likelihood that abrupt lane change will occur after automated driving has been started. This abrupt behavior may give a sense of incompatibility to a driver.

Therefore, the behavior plan creating unit 123 sets a corrected target path in the automated driving transition section such that abrupt vehicle behavior will not occur. The corrected target path is set to maintain a movement state acquired by the movement state acquiring unit 124 before automated driving has been started.

Maintaining a movement state means that speeds in the running direction of the host vehicle M and in the lateral direction perpendicular to the running direction which are acquired by the movement state acquiring unit 124 before automated driving has been started are maintained as constant as possible. That is, a corrected target path in which the host vehicle performs lane change or acceleration or deceleration as little as possible and is able to run along a road is set in the automated driving transition section.

Figure 5:
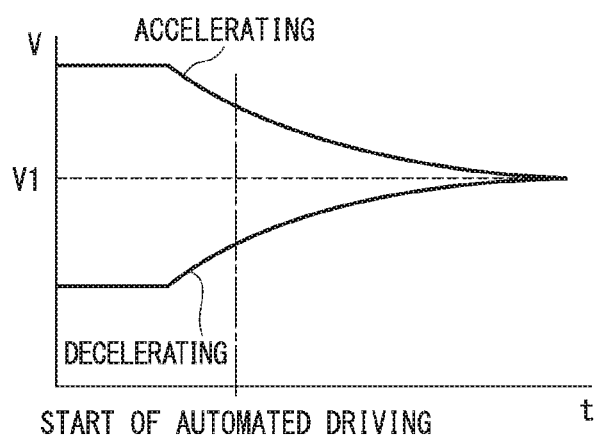
FIG. 5 is a diagram illustrating speed control of a host vehicle in an automated driving transition section.
Figure 6:
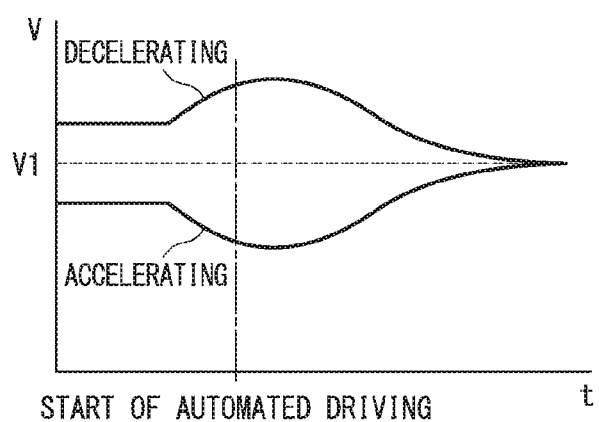
FIG. 6 is a diagram illustrating speed control of a host vehicle in an automated driving transition section.

The behavior plan creating unit 123 creates a behavior plan such that the speed does not immediately match the target speed but changes smoothly to the target speed from the current speed. FIGS. 5 and 6 are diagrams illustrating speed control of the host vehicle M in an automated driving transition section. When the host vehicle M is accelerating or decelerating at the time of start of automated driving, the behavior plan creating unit 123 creates a behavior plan such that a speed of the host vehicle M change smoothly until the speed reaches a target speed V1.

The behavior plan creating unit 123 controls the running control unit 141 in the automated driving transition section such that a degree of operation of an accelerator pedal changes and the speed of the host vehicle M smoothly reaches the target speed V1. For example, the running control unit 141 allows the speed of the host vehicle M to reach the target speed V1 by increasing or decreasing the acceleration with the elapse of time.

Specifically, when the speed approaches the target speed V1 by acceleration or deceleration, the behavior plan creating unit 123 changes the speed smoothly until the speed reaches the target speed V1 (see FIG. 5). When the speed increases from a speed higher than the target speed V1 or the speed decreases from a speed lower than the target speed V1, the behavior plan creating unit 123 changes the speed by performing smooth acceleration in a reverse direction such that the speed reaches the target speed V1 (see FIG. 6). Accordingly, it is possible to prevent behavior such as abrupt acceleration or deceleration of the host vehicle M.

When the host vehicle M runs on an alternative lane in an automated driving transition section, a corrected target path is set such that the host vehicle maintains running on the alternative lane in the automated driving transition section. The corrected target path is set such that lane change from the alternative lane to the recommended lane is performed after the host vehicle passes through the automated driving transition section. When lane change due to branching is planned and there is necessity for lane change of the host vehicle M from the current running lane in the automated driving transition section, the behavior plan creating unit 123 starts lane change when the host vehicle has run a predetermined distance or a predetermined time.

For example, when there is a branch lane on which a target path is set in an automated driving transition section in a state in which the host vehicle M is running on a recommended lane, automated driving control is performed such that the host vehicle runs a predetermined distance or a predetermined time while maintaining the movement state in manual driving as much as possible. Automated driving control is performed such that the speed changes smoothly in the running direction or the lateral direction at the time of lane change.

When automated driving has been started while the host vehicle M in manual driving is running on an alternative lane, lane change to a recommended lane is performed after the host vehicle has run a predetermined distance or a predetermined time while maintaining the movement state in manual driving. As described above, by setting a corrected target path in an automated driving transition section, it is possible to inhibit behavior such as abrupt lane change or acceleration or deceleration of the host vehicle and to prevent a driver from feeling a sense of compatibility.

Figure 7:
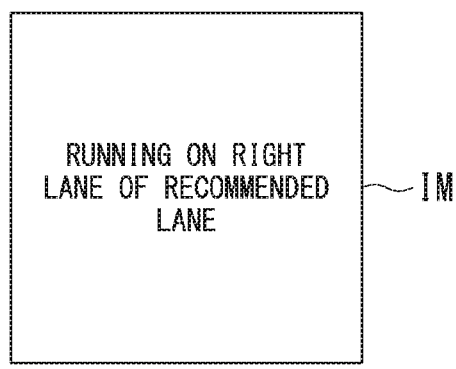
FIG. 7 is a diagram illustrating an image which is displayed on an HMI.

When the host vehicle M runs on an alternative lane in an automated driving transition section, an image IM indicating information representing that the lane on which the host vehicle M is running is different from a preset lane may be displayed for a driver. FIG. 7 is a diagram illustrating an image IM which is displayed on the HMI 30. The image IM is displayed on the HMI 30 by the HMI control unit 125 which is interlinked with the behavior plan creating unit 123. The image IM includes, for example, a text message of "running on the right lane of the recommended lane (the left lane in case of keep-right)." An event which occurs within a predetermined time such as "a lane is changed" is displayed after the image IM has been displayed. Accordingly, a driver can cope with behavior of the host vehicle M after automated driving has been started.

Figure 8:
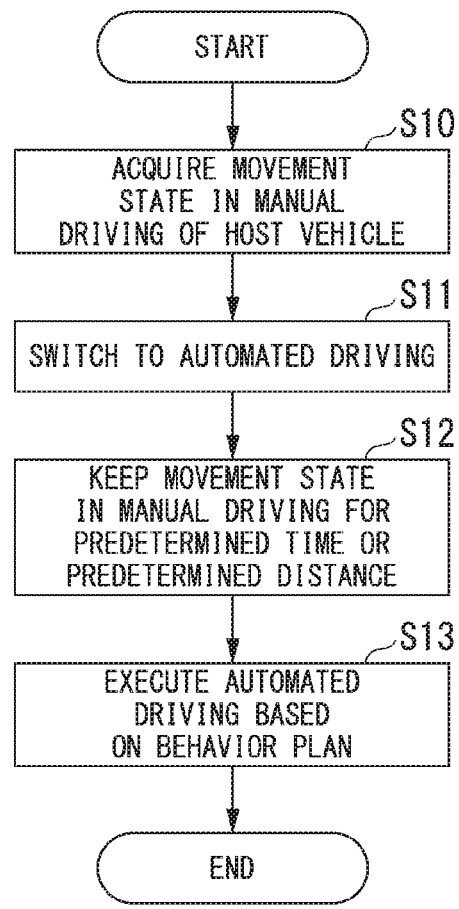
FIG. 8 is a flowchart illustrating a flow of processes of automated driving control in an automated driving transition section.

An automated driving control method in an automated driving transition section will be described below. FIG. 8 is a flowchart illustrating a flow of processes of automated driving control in an automated driving transition section. The movement state acquiring unit 124 acquires data on movement states in the running direction and the lateral direction while the host vehicle M is in manual driving (Step S10). The automated driving control unit 100 starts automated driving by switching from manual driving on the basis of a behavior plan (Step S11).

When automated driving has been started by switching from manual driving, the automated driving control unit 100 executes automated driving such that the movement states acquired by the movement state acquiring unit 124 before automated driving has been started is maintained for a predetermined time or a predetermined distance (Step S13).

As described above, with the vehicle control device 1, it is possible to realize smooth switch to automated driving when manual driving is switched to automated driving and to prevent a driver from feeling a sense of compatibility. With the vehicle control device 1, by setting a corrected target path in an automated driving transition section, it is possible to inhibit behavior such as abrupt lane change or acceleration or deceleration of the host vehicle.

With the vehicle control device 1, when the host vehicle M is running on an alternative lane in an automated driving transition section, information indicating that the lane in which the host vehicle M is running is different from a preset lane is displayed for a driver and thus the driver can cope with behavior of the host vehicle M after automated driving has been started. In addition, with the vehicle control device 1, when the host vehicle M is accelerating or decelerating at the time of start of automated driving, the speed of the host vehicle M changes smoothly until the speed reaches the target speed V1 and thus it is possible to prevent abrupt acceleration or deceleration of the host vehicle M.

While embodiments of the invention have been described above, the invention is not limited to the embodiments and can be subjected to various modifications and substitutions without departing from the gist of the invention.

REFERENCE SIGNS LIST

1 Vehicle control device
10 Camera
12 Radar device
14 Finder
16 Object recognizing device
20 Communication device
30 HMI
40 ETC onboard unit
50 Navigation device
51 GPS receiver
53 Route determining unit
54 First map information
60 MPU
61 Recommended lane determining unit
62 Second map information
70 Vehicle sensor
80 Driving operator
90 Interior camera
100 Automated driving control unit
120 First control unit
121 Outside recognizing unit
122 Vehicle position recognizing unit
123 Behavior plan creating unit
124 Movement state acquiring unit
125 HMI control unit
140 Second control unit
141 Running control unit
200 Running driving force output device
210 Brake device
220 Steering device

What is claimed is:

1. A vehicle control device comprising:
a processor that executes a software program, which causes the processor to:
execute automated driving of a vehicle; and
acquire movement states in a running direction and a lateral direction of the vehicle,
wherein, when automated driving has been started by switching from manual driving, the processor is configured to execute automated driving such that the movement states which have been acquired by the processor before automated driving has been started are maintained for a predetermined time or a predetermined distance.

2. The vehicle control device according to claim 1, wherein the processor is configured to start lane change after the vehicle has run a predetermined distance or a predetermined time in a case in which there is necessity for lane change due to branching when automated driving has been started by switching from manual driving.

3. The vehicle control device according to claim 2, wherein the software program is further executable to cause the processor to:
output information indicating that a lane on which the vehicle is running is different from a preset lane when the lane on which the vehicle is running is different from the preset lane after the processor has started automated driving by switching from manual driving.

4. The vehicle control device according to any one of claims 1 to 3, wherein the processor is configured to smoothly change a speed of the vehicle until the speed reaches a target speed when the vehicle is accelerating or decelerating after the automated driving has been started.

5. A vehicle control method causing a computer to perform:
executing automated driving of a vehicle;
acquiring movement states in a running direction and a lateral direction of the vehicle; and
executing automated driving such that, when automated driving has been started by switching from manual driving, the movement states which have been acquired before automated driving has been started are maintained for a predetermined time or a predetermined distance.

6. A program causing a computer to perform:
executing automated driving of a vehicle;
acquiring movement states in a running direction and a lateral direction of the vehicle; and
executing automated driving such that, when automated driving has been started by switching from manual driving, the movement states which have been acquired before automated driving has been started are maintained for a predetermined time or a predetermined distance.

* * * * *